United States Patent
Matsumoto et al.

(10) Patent No.: US 6,760,278 B2
(45) Date of Patent: Jul. 6, 2004

(54) MAGNETIC HEAD AND DATA RECORDING AND REPRODUCTION DEVICE

(75) Inventors: Tsuyoshi Matsumoto, Kawasaki (JP); Tohru Fujimaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 282 days.

(21) Appl. No.: 10/095,986

(22) Filed: Mar. 12, 2002

(65) Prior Publication Data

US 2003/0107954 A1 Jun. 12, 2003

(30) Foreign Application Priority Data

Dec. 11, 2001 (JP) ........................................ 2001-376650

(51) Int. Cl.[7] .............................................. G11B 11/00
(52) U.S. Cl. ................................................... 369/13.17
(58) Field of Search ........................... 369/13.17, 13.23, 369/13.22, 13.18, 13.19, 13.2, 13.21

(56) References Cited

U.S. PATENT DOCUMENTS

| | | | | |
|---|---|---|---|---|
| 6,064,632 A | * | 5/2000 | Nakaoki et al. | 369/13.32 |
| RE37,428 E | * | 10/2001 | Watanabe et al. | 369/13.17 |
| 6,307,818 B1 | * | 10/2001 | Jerman et al. | 369/13.17 |
| 6,351,436 B1 | * | 2/2002 | Mallary | 369/13.17 |
| 6,618,330 B1 | * | 9/2003 | Kawasaki et al. | 369/13.23 |
| 2003/0026174 A1 | * | 2/2003 | Yoshikawa et al. | 369/13.23 |
| 2003/0142593 A1 | * | 7/2003 | Fujimaki et al. | 369/13.17 |

FOREIGN PATENT DOCUMENTS

| | | |
|---|---|---|
| EP | 0 910 078 | 4/1999 |
| JP | 10-255207 | 9/1998 |
| JP | 2000-276806 | 10/2000 |
| JP | 2001-102230 | * 4/2001 |

* cited by examiner

Primary Examiner—Allen Cao
(74) Attorney, Agent, or Firm—Greer, Burns & Crain, Ltd.

(57) ABSTRACT

A magnetic head includes a coil for generating a magnetic field, and an electroconductive film superposed over the coil in the axial direction of the coil. The film is formed with a hole in the center. The electroconductive film is composed of a non-magnetic substance, and a first slit is formed in the electroconductive film extending from the hole to the outer peripheral edge of the electroconductive film. A second slit surrounds the inner peripheral edge of the electroconductive film. A continuity component is formed to electrically connect the inner peripheral edge of the electroconductive film to a radially outer region of the electroconductive film.

16 Claims, 13 Drawing Sheets

MAGNETIC HEAD AND DATA RECORDING AND REPRODUCTION DEVICE

BACKGROUND OF THE INVENTION

1. Field of the Invention

The present invention relates to a data recording and reproduction device such as a magneto-optical disk device or magnetic disk device. It also relates to a magnetic head used as a constituent component of such a data recording and reproduction device.

The term "magnetic head" as used in this specification refers to a data recording and reproduction head equipped with a coil for generating a magnetic field, and is a concept encompassing a "magneto-optical" head equipped with an optical lens.

2. Description of the Related Art

FIG. 14 illustrates an example of a magneto-optical head. This magneto-optical head comprises object lenses 91a and 91b and a magnetic field generating coil 92, all mounted on a lens holder 90. The object lenses 91a and 91b focus laser light traveling from a laser light source, thereby forming a beam spot on a magneto-optical disk D. The coil 92 is used to apply a magnetic field at the place where the beam spot is formed, and may be provided on the lens surface of the object lens 91b that is across from the magneto-optical disk D. This configuration allows the coil 92 to be moved closer to the magneto-optical disk D. Accordingly, compared to a conventional design in which an optical head equipped with an object lens is provided separately from a magnetic head comprising a coil, the coil uses less electric power, and a low inductance type can be used, which is advantageous in raising the data transfer rate using a magnetic field modulation system.

With a magneto-optical head structured as above, the lower the inductance of the coil 92 is, the more the drive frequency of the coil 92 can be raised, and the higher the transmission rate can be. To lower the inductance of the coil 92, the magnetic field generated by the coil 92 must be made to act efficiently at the prescribed place on the magneto-optical disk D. In view of this, it has been proposed in the prior art that a magnetic substance (soft magnetic substance) be provided in proximity with the coil 92, thereby concentrating the flux of the magnetic field generated by the coil 92 in the center of the coil 92.

However, the following problems have been encountered with the above prior art proposal.

Namely, when the coil 92 is driven with alternating current, an eddy current (induced current) flows in the magnetic substance so as to cancel out changes in the magnetic field generated by this coil 92. This eddy current causes the magnetic substance to generate heat. Heat is also generated as a result of the hysteresis loss of the magnetic substance. The amount of heat generated by the magnetic substance due to the above factors increases sharply as the drive frequency of the coil 92 rises, and this, coupled with the heat generated by the coil 92 itself, ends up raising the temperature of the coil 92. In addition to being a cause of disconnection of the coil 92, this temperature elevation of the coil 92 also drives up the electrical resistance of the coil 92, leading to a vicious cycle whereby the heat generation of the coil 92 is accelerated even further. Also, when the laser light focused by the object lenses 91a and 91b passes through the center of the coil 92, the above-mentioned temperature elevation of the coil 92 deteriorates the optical characteristics of the magneto-optical head. Thus, the problem of heat generation is encountered when an attempt is made to drive the coil 92 at a higher frequency, and there is room for improvement in this respect.

SUMMARY OF THE INVENTION

The present invention has been proposed in light of these circumstances, and it is an object of the present invention to provide a magnetic head with which temperature elevation of a magnetic field generating coil can be suppressed while the drive frequency of the coil is raised, thereby achieving a suitably high data transfer rate. Another object of the present invention is to provide a data recording and reproduction device equipped with this magnetic head.

The present invention employs the following technological means for achieving the above objects.

According to a first aspect of the present invention, there is provided a magnetic head including: a coil for applying a magnetic field to a recording medium; and a first electroconductive film superposed over the coil in an axial direction of the coil so as to be electrically insulated from the coil, the film being formed with a central hole. The first electroconductive film is composed of a non-magnetic substance. Also, the first electroconductive film is formed with a first slit extending from the hole to an outer peripheral edge of the first electroconductive film.

This constitution makes it possible for the above-mentioned electroconductive film to serve as a heat-radiating member that allows heat generated from the coil to escape. Because this film is electroconductive, less heat will be generated as a result of electrical resistance when induced current flows in this film. Also, because the electroconductive film is a non-magnetic substance, heat generation due to hysteresis loss can be suppressed. This makes it possible to minimize the temperature elevation of the coil.

Meanwhile, although the principle will be described in detail below, as a result of providing the above-mentioned first slit, when induced current flows in the electroconductive film, induced current that would act to strengthen the magnetic field generated by the coil can be made to flow to the inner peripheral edge of the first electroconductive film. Therefore, not only is the magnetic field generated by the coil kept from being weakened by the induced current flowing in the first electroconductive film, but the above-mentioned magnetic field can actually be strengthened by effective utilization of the induced current. As a result, a coil with a correspondingly lower inductance can be used. Consequently, with the present invention, the coil can be driven at a high frequency while the temperature elevation of the magnetic field generating coil is suppressed, which contributes to a higher transfer rate.

Preferably, the first electroconductive film may be provided with a second slit surrounding an inner peripheral edge of the first electroconductive film and with a continuity component that electrically connects part of the inner peripheral edge of the first electroconductive film to a region of the film that is outside of the second slit. The principle behind this constitution will also be described in detail below, but this constitution makes it possible to move the center of the electroconductive film farther away from the place where induced current flows and acts to weaken the magnetic field generated by the coil, thereby further strengthening the magnetic field.

Preferably, the magnetic head of the present invention may further include a dielectric film that covers the coil and includes a surface facing the recording medium. The dielectric film electrically insulates the coil from the first electroconductive film. This constitution affords more secure electrical insulation between the coil and the first electroconductive film. It also results in the coil being suitably protected.

Preferably, the first electroconductive film may have a higher thermal conductivity than the dielectric film. This constitution suitably imparts a heat radiation function to the first electroconductive film.

Preferably, the first electroconductive film may have an outer diameter which is greater than an outside diameter of the coil. This constitution enhances the heat radiation function of the first electroconductive film in proportion to the increase in its volume.

Preferably, the magnetic head of the present invention may further include an object lens for forming a beam spot on the recording medium by focusing a light beam traveling from a light source. After passing through the object lens, the light beam reaches the recording medium via a light transmitting component formed in the center of the coil and via the hole formed in the first electroconductive film. This constitution is favorable with a head used for a magneto-optical recording medium.

Preferably, the second slit may be formed substantially in a C-shape having two ends, and the continuity component may be disposed between the first slit and the ends of the second slit. With this constitution, the intended operation of the present invention is favorably obtained with a simple structure.

Preferably, the magnetic head of the present invention may further include an additional electroconductive film arranged in the second slit. This additional electroconductive film is electrically insulated from the first electroconductive film. This constitution makes it possible to improve the thermal conductivity between mutually opposed portions of the electroconductive films on either side of the second slit, which affords a corresponding increase in heat radiation for the electroconductive film as a whole.

Preferably, the additional electroconductive film may include two arc-shaped portions spaced apart in a radial direction of the coil, and connecting portions that link together ends of the two arc-shaped portions. The specific operation with this constitution will be described below, but induced current that would act to strengthen the magnetic field generated by the coil can be made to flow to the arc-shaped portion out of the above-mentioned two arc-shaped portions which is closer to the center of the first electroconductive film. This is favorable in that the magnetic field is strengthened.

Preferably, the first electroconductive film may be formed with a plurality of third slits extending radially of the coil, each of the third slits running from a location outside of the second slit to an outer peripheral edge of the first electroconductive film. The specific operation with this constitution will be described below, but this constitution is again favorable in that the magnetic field generated by the coil is strengthened.

Preferably, the first electroconductive film may be located opposite the recording medium with the coil therebetween and may be covered by the dielectric film. This constitution allows the coil to be closer to the recording medium than the first electroconductive film, and is therefore advantageous in terms of reducing the inside diameter of the coil and lowering its inductance when a light beam is passed through the center of this coil.

Preferably, the first electroconductive film may be provided with a thick portion protruding toward a surface of the dielectric film. This constitution enhances the heat radiation function of the electroconductive film.

Preferably, the first electroconductive film may be located closer to the recording medium than the coil. This constitution allows the first electroconductive film to be disposed in the vicinity of the top layer of the dielectric film, which again enhances the heat radiation function.

Preferably, the first electroconductive film may include two electroconductive film members that sandwich the coil in an axial direction of the coil. This constitution increases the overall volume and surface area of the two electroconductive film members, and this also improves the heat radiation function. Also, because the magnetic field generated by the coil is strengthened by the induced current flowing in the two electroconductive film members, this embodiment is also advantageous in that it promotes lower coil inductance.

Preferably, the magnetic head of the present invention may further include a slider that floats over the recording medium when the recording medium rotates. The coil and the first electroconductive film may be mounted on the slider. This constitution reduces the distance between the coil and the recording medium, and is therefore favorable for making the magnetic field act more efficiently at the specified place on the recording medium. Also, when the present invention is applied to a magneto-optical recording medium, the settings can be adjusted so that a light beam passes through the center of the coil in a state of having been focused to a quite small diameter, and this also helps reduce the coil diameter. Therefore, this embodiment is favorable for lowering the inductance of the coil. Also, the coil can be cooled by air flow between the slider and the recording medium, so the cooling efficiency is also better.

According to a second embodiment of the present invention, there is provided a data recording and reproduction device provided with a magnetic head according to the first aspect of the present invention described above.

Other features and advantages of the present invention will be clear from the following description of embodiments of the invention.

DETAILED DESCRIPTION OF THE PREFERRED EMBODIMENT

Preferred embodiments of the present invention will now be described with reference to the drawings.

Figure 1:
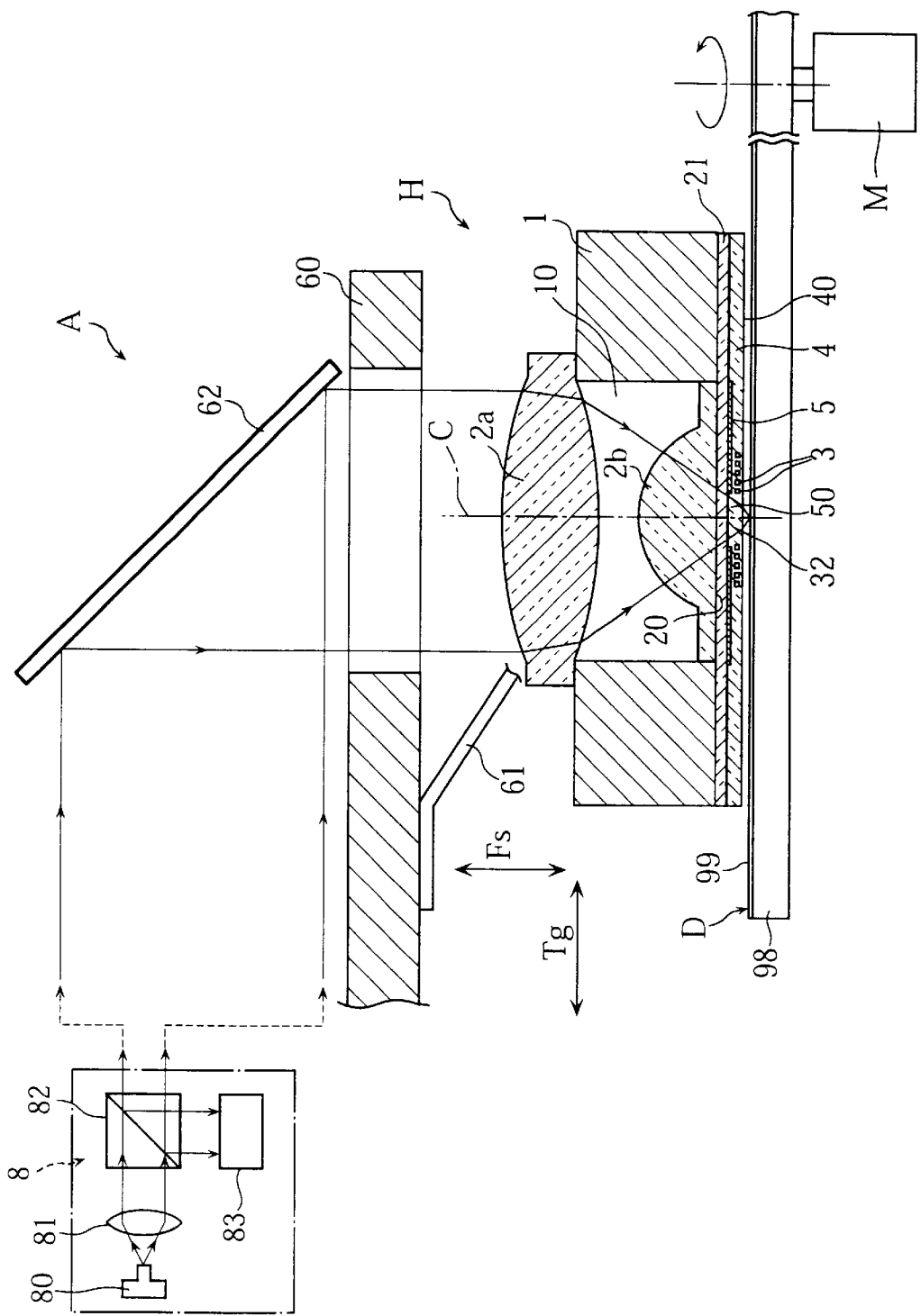
FIG. 1 is a cross section of an embodiment of the present invention.
Figure 2:
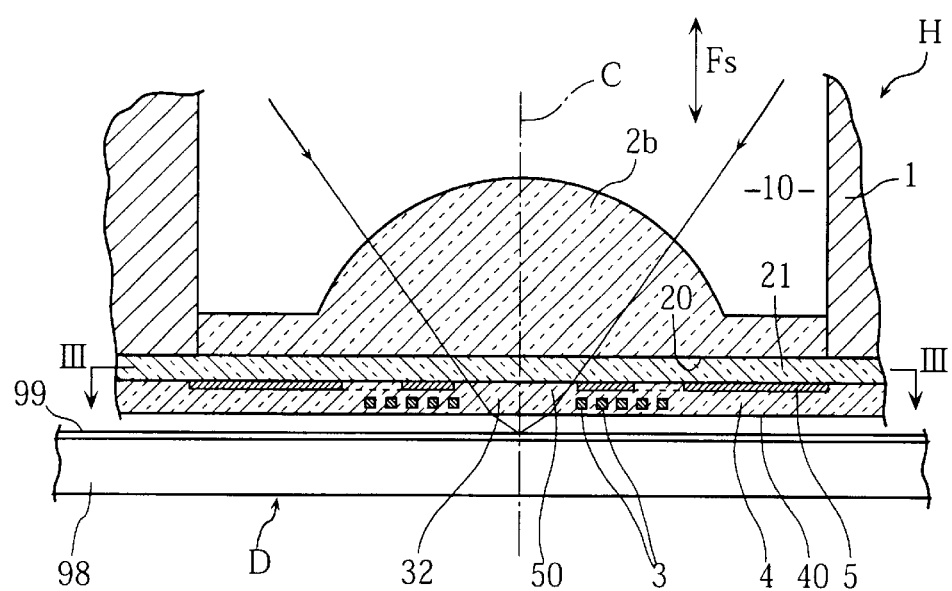
FIG. 2 is a detail enlargement cross section of FIG. 1.
Figure 3:
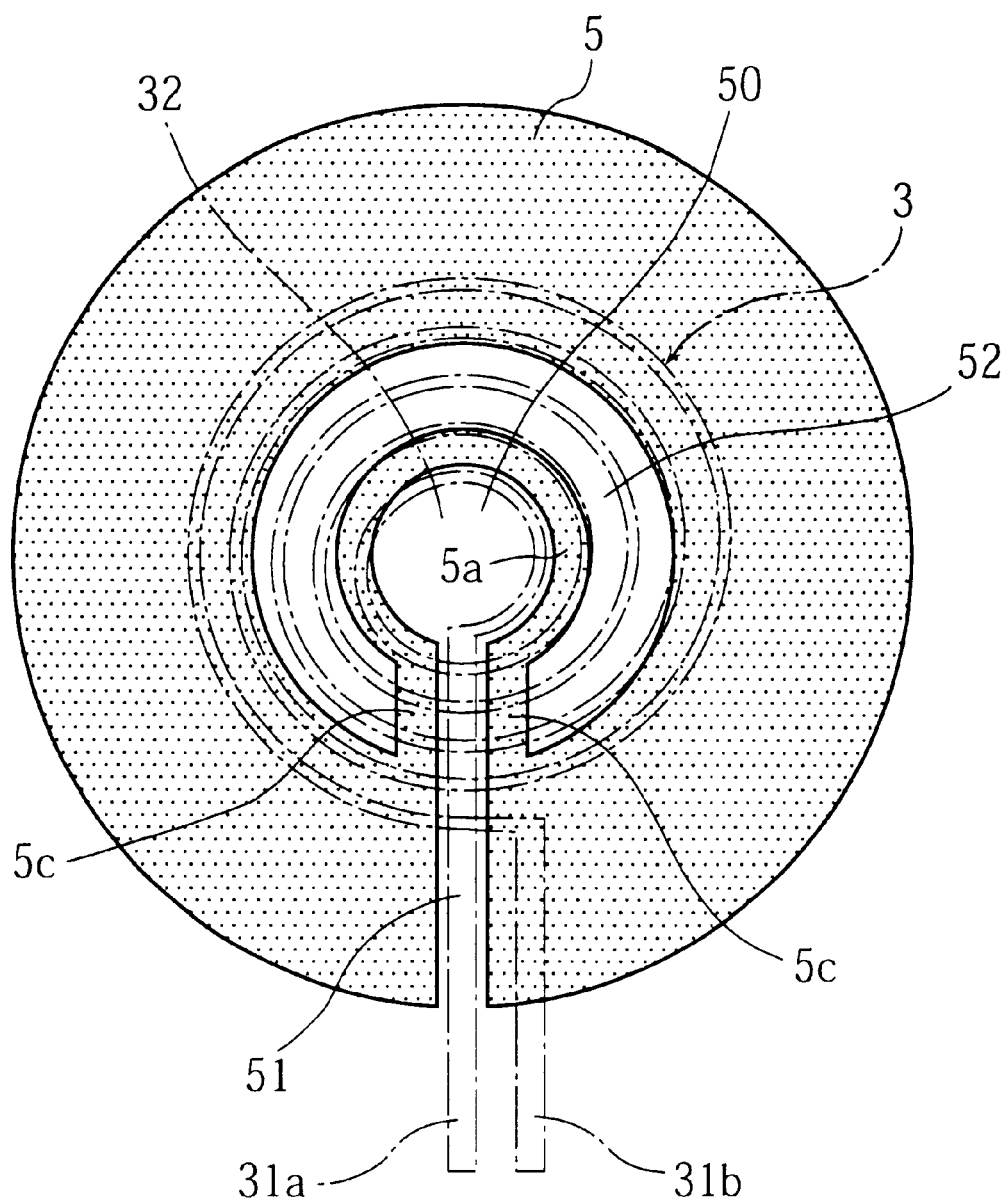
FIG. 3 is a view taken along the III-III line in FIG. 2.

FIGS. 1 to 3 illustrate an embodiment of the present invention. The data recording and reproduction device A shown in FIG. 1 is configured as a magneto-optical disk device equipped with a magnetic head H. The magnetic head H is configured as a magneto-optical head, and comprises a slider 1, first and second lenses 2a and 2b which are object lenses, a coil 3 for generating a magnetic field, a dielectric film 4, and an electroconductive film 5.

The slider 1 is in the form of a ceramic sheet or block, for example. This slider 1 is supported by an arm 60 via a suspension 61, and is positioned above a magneto-optical disk D. The magneto-optical disk D comprises a recording layer 99 formed on the top surface of a substrate 98, and this embodiment features a surface recording system in which the magnetic head H and the recording layer 99 are directly across from one another, without the substrate 98 interposed therebetween. The arm 60 is configured as a linear acting arm capable of reciprocal motion in the radial direction of the magneto-optical disk D (the tracking direction Tg) so that the slider 1 can be moved in this same direction. Alternatively, the arm 60 may be configured as a swing arm that is able to swing about a prescribed axis. The suspension 61 is capable of elastic deformation in the focus direction Fs, and is designed such that when the magneto-optical disk D is rotated at high speed by the drive of a spindle motor M, a high-speed air flow passes between the surface of the magneto-optical disk D and the dielectric film 4, causing the slider 1 to float a specific tiny distance over the magneto-optical disk D.

The distal end of the arm 60 is provided with a mirror 62 that reflects laser light emitted from a fixed optical component 8 equipped with a laser diode 80 and a collimator lens 81, so that this light is incident first on the first lens 2a and then the second lens 2b. The fixed optical component 8 is also provided with a beam splitter 82 and a photodetector 83, and is designed such that the light that impinges on and is reflected by the magneto-optical disk D will be detected by the photodetector 83.

The first and second lenses 2a and 2b serve to form a beam spot on the recording layer 99 of the magneto-optical disk D by successively focusing the laser light they receive. The first lens 2a is mounted on the top surface of the slider 1, for example, while the second lens 2b is located directly under the first lens 2a by being housed inside a through-hole 10 in the slider 1. Using a plurality of lenses as the object lens makes it easy to raise the numerical aperture of the object lens. The downward-facing lens surface 20 of the second lens 2b is formed flat, and a transparent substrate 21 is bonded to this lens surface 20. As will be discussed below, the role of the transparent substrate 21 is as a substrate on which the coil 3, dielectric film 4, and electroconductive film 5 are formed, and this transparent substrate 21 is bonded to all or part of the downward-facing surface of the slider 1, for example. The transparent substrate 21 is made of glass, for instance, and has a refractive index that is the same or substantially the same as that of the second lens 2b. The dielectric film 4 is also composed of a transparent substance such as alumina or silicon dioxide having the same refractive index. Therefore, the second lens 2b, the transparent substrate 21, and the dielectric film 4 are essentially all three integrated into a single lens, with the thickness of the second lens 2b itself being reduced from what it would be otherwise by an amount corresponding to the thickness of the transparent substrate 21 and the dielectric film 4.

The coil 3 is formed from a conductor thin film, and is in a spiral shape as indicated by the imaginary lines in FIG. 3. A pair of leads 31a and 31b are formed connected to the coil 3. Although not depicted in the drawings, the coil 3 is constructed such that it has a through-hole for avoiding conduction between the lead 31a and the coil 3. Naturally, the specific structure of the coil is not limited to the above in the present invention. For instance, the coil may instead have a multilayer structure made up of two or more layers of conductor thin film. While not shown in FIGS. 1 and 2, the leads 31a and 31b extend to the side surface of the dielectric film 4, allowing power to be supplied to the coil 3 from this portion. The center of the coil 3 is aligned with the center axis C of the first and second lenses 2a and 2b.

The dielectric film 4 covers the coil 3 and the electroconductive film 5, and the surface thereof 40 facing the magneto-optical disk D is flat. Part of this dielectric film 4 protrudes into the center of the coil 3, and the middle part of the coil 3 is configured as a light transmitting component 32 capable of transmitting laser light. In order for the inductance of the coil 3 to be kept low, the diameter of the light transmitting component 32 (the inside diameter of the coil 3) should be as small as possible, while being large enough not to block the path of the laser light.

The electroconductive film 5 is composed of a non-magnetic substance with a higher thermal conductivity than dielectric film 4, such as copper, aluminum, or silver. This electroconductive film 5 is formed between the transparent substrate 21 and the coil 3, and is in the approximate form of a hollow cylinder whose center is aligned with the center axis C of the coil 3 and the first and second lenses 2a and 2b. As clearly shown in FIG. 3, a hole 50 is provided in the center of this electroconductive film 5. This hole 50 has the same role as the light transmitting component 32 of the coil 3, which is to serve as a light transmitting component that transmits laser light. The outside diameter of the electroconductive film 5 should be larger than that of the coil 3. The advantage to thus increasing the outside diameter of the electroconductive film 5 is that it increases the volume and surface area of the electroconductive film 5 and thereby improves the heat radiation thereof.

A first slit 51 and a second slit 52 are formed in the electroconductive film 5. The first slit 51 extends from the hole 50 to the outer peripheral edge of the electroconductive film 5, running in the radial direction of the coil 3 and the electroconductive film 5. In this embodiment, since the lead 31a of the coil 3 is formed at the place where this first slit 51 is formed, the lead 31a and the electroconductive film 5 can be prevented from conducting to each other, and can be formed on the same surface of the transparent substrate 21. The present invention is not limited to this configuration, however.

The second slit 52 is formed substantially in a C-shape surrounding the inner peripheral edge 5a of the electroconductive film 5. The ends of this second slit 52 are close to each other, so as to envelop the first slit 51, and a pair of continuity components 5c are formed in between these ends. The pair of continuity components 5c electrically connect the inner peripheral edge 5a of the electroconductive film 5 with the region of the film 5 that is outside of the second slit 52.

The above-mentioned coil 3, dielectric film 4, and electroconductive film 5 of the magnetic head H can be produced by the steps illustrated in FIGS. 4A to 4J, for example.

Figure 4A:
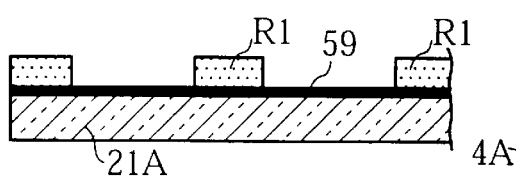
FIGS. 4A to 4J are cross sections illustrating a series of the main steps in manufacturing a magnetic head.
Figure 4B:
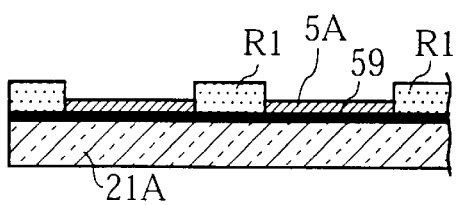
Figure 4C:
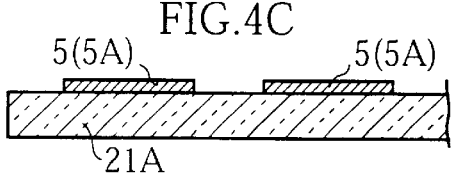

First, as shown in FIG. 4A, a plating seed film 59 is formed by vapor deposition, for example, on the surface of a glass substrate 21A, which serves as the raw material for the transparent substrate 21. Over the film 59 is formed a resist film R1 in a pattern. The shape of the resist film R1 corresponds to the electroconductive film 5. Next, as shown in FIG. 4B, a copper film 5A, for example, is formed by plating over the portion of the plating seed film 59 where the resist film R1 has not been formed. Thereafter, the resist film R1 is washed away, and the plating seed film 59 is removed by ion milling. This yields the electroconductive film 5 composed of the copper film 5A, as shown in FIG. 4C. The first and second slits 51 and 52 formed on the electroconductive film 5 are not shown in FIG. 4.

Figure 4D:
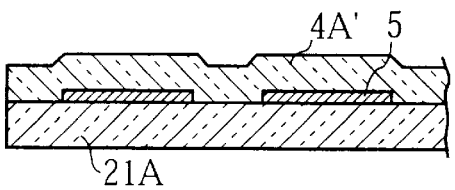
Figure 4E:
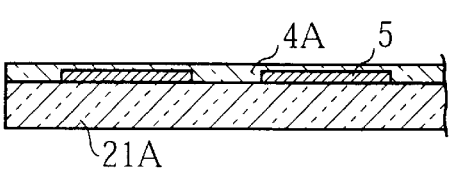
Figure 4F:
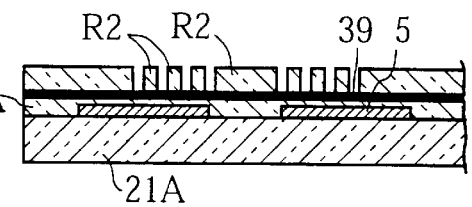
Figure 4G:
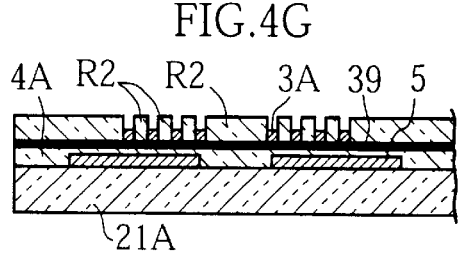
Figure 4H:
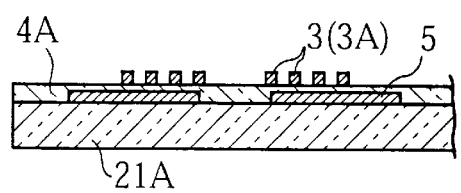
Figure 4I:
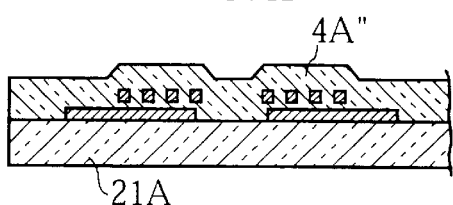
Figure 4J:
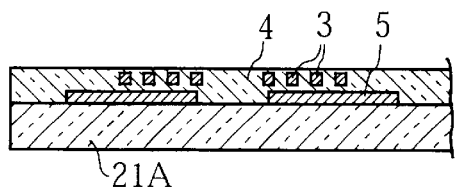

After this, as shown in FIGS. 4D and 4E, an alumina film 4A' is formed over the glass substrate 21A so as to cover the electroconductive film 5, and the surface of this alumina film 4A' is subjected to a smoothing treatment such as chemical-mechanical polishing to obtain an alumina film 4A with a smoothed surface. Next, as shown in FIG. 4F, a plating seed film 39 is formed by vapor deposition, for example, over the alumina film 4A, over which a resist film R2 is formed in a pattern. The shape of the resist film R2 corresponds to the coil 3. After this, the same steps as in the formation of the electroconductive film 5 are repeated. Specifically, as shown in FIG. 4G, a copper film 3A is formed by plating over the portion of the plating seed film 39 where the resist film R2 has not been formed, and then the resist film R2 and the plating seed film 39 are removed, which yields the coil 3 composed of the copper film 3A, as shown in FIG. 4H. After the formation of the coil 3, an alumina film 4A" is formed and its surface subjected to a smoothing treatment, as shown in FIGS. 4I and 4J. This yields the dielectric film 4 composed of a plurality of layers of alumina film.

The above series of steps are a simple way to obtain the electroconductive film 5, the coil 3, and the dielectric film 4 formed in their specified structures on the glass substrate 21A. In the manufacture of the magnetic head H, after the glass substrate 21A has been bonded to one side of the slider 1, the second lens 2b is bonded to the opposite side of the glass substrate 21A. The glass substrate 21A can also be ground down on one side to the required thickness prior to the stage at which the slider 1 and the second lens 2b are bonded. The above description is a specific example of the manufacture of one part for a single magnetic head H, but in actual practice a glass substrate 21A in the form of a wafer is used, for instance, and a plurality of parts are taken collectively from the glass substrate 21A. This is advantageous to improving productivity.

The action of the above-mentioned magnetic head H will now be described.

When the writing of data to the magneto-optical disk D is performed by a magnetic field modulation system, a beam spot of laser light is continuously formed on the target track of the recording layer 99 while the magneto-optical disk D rotates. Forming this beam spot raises the temperature of the specified magnetic substance of the recording layer 99 to the Curie temperature. Meanwhile, high-frequency current is sent to the coil 3 to switch the direction of the magnetic field flux. This control allows the orientation of magnetization of the magnetic substance of the recording layer 99 to be controlled and data to be written.

During this data write processing, part of the heat generated from the coil 3 is transmitted through the dielectric film 4 to the electroconductive film 5. This electroconductive film 5 has better thermal conductivity than the dielectric film 4, and it is larger in size than the coil 3, so this electroconductive film 5 exhibits a good heat radiation effect. Also, in the electroconductive film 5, unlike a magnetic substance, heat generation caused by hysteresis loss is suppressed. Therefore, temperature elevation is suppressed in the coil 3 and its surrounding areas, which protects the coil 3. Another benefit of suppressing temperature elevation in the coil 3 is that it prevents the electrical resistance in the coil 3 from rising as the temperature goes up, so this also favorably prevents such related phenomena as higher power consumption, as well as further rises in the heat generation temperature of the coil 3 attributable to higher power consumption.

Induced current flows through the electroconductive film 5 when high-frequency current is sent from the power supply (not shown) to the coil 3. To facilitate an understanding of what happens here, the basic action of the magnetic head pertaining to the present invention will first be described with reference to FIGS. 6a and 6b. Elements that are the same as or similar to those in this embodiment are numbered the same in FIG. 6. The coil 3 is shown in a simplified circular form indicated by a broken line in FIGS. 5B and 6B.

Figure 6A:
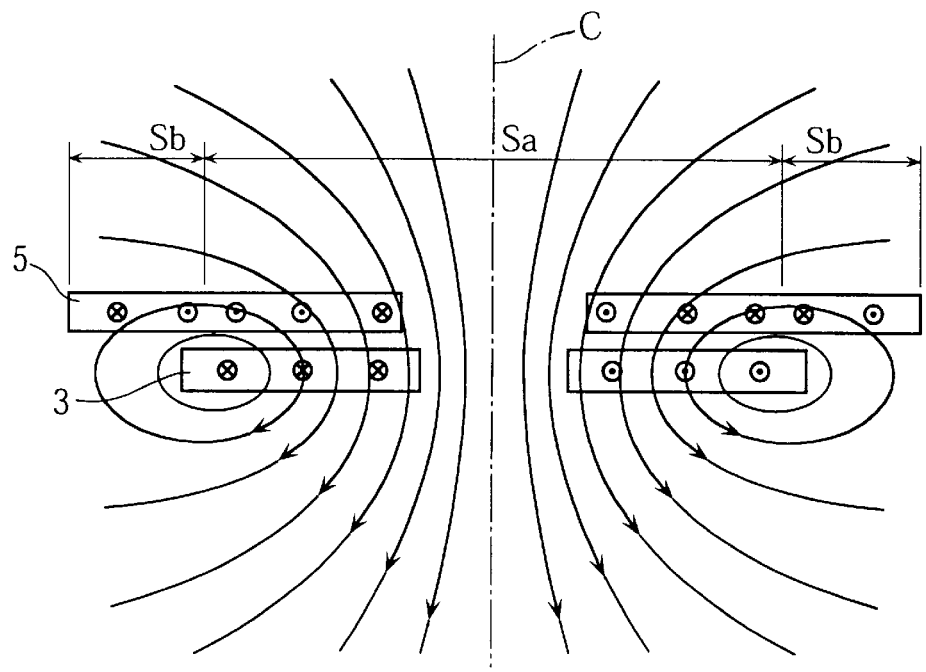
FIGS. 6A and 6B are diagrams of the basic operation of the magnetic head pertaining to the present invention.
Figure 6B:
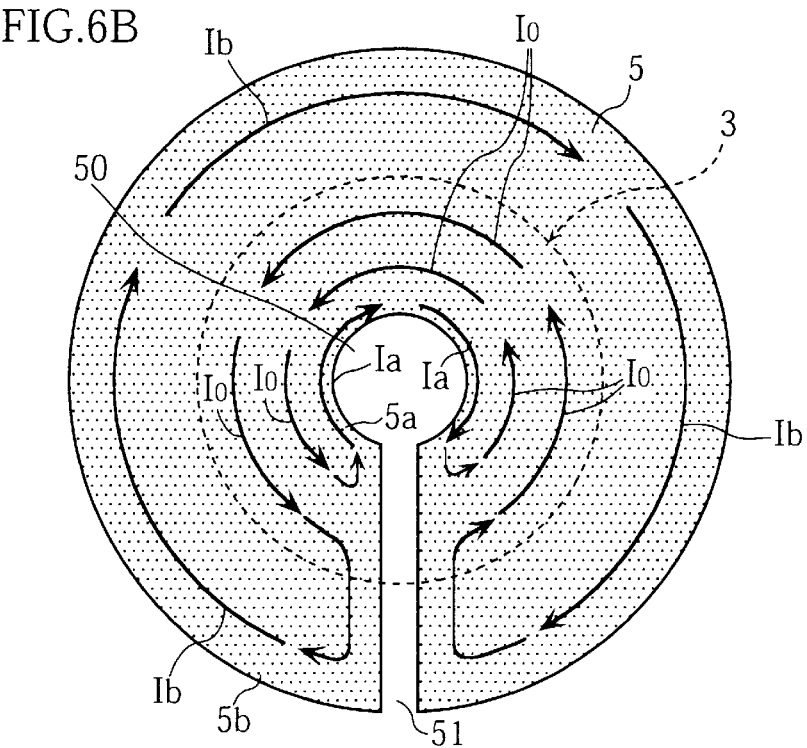

In the structure shown in FIG. 6B, the first slit 51 is formed in the electroconductive film 5 having a hole 50 in its center, but no means corresponding to the second slit 52 is provided. The coil 3 generates a magnetic field having lines of magnetic force such as those shown in FIG. 6A, and this field acts on the electroconductive film 5. Because the electroconductive film 5 is larger in diameter than the coil 3, the orientation of the lines of magnetic force of the field acting on the electroconductive film 5 is different in the region near the inner periphery of the electroconductive film 5 from that in the region near the outer periphery. For instance, if current is flowing through the coil 3 in the direction indicated by the symbols in FIG. 6A, the lines of magnetic force will point downward in the region Sa near the center of the electroconductive film 5, whereas they will point upward in the region Sb near the outer periphery. Induced current flowing through the electroconductive film 5 flows so as to generate a magnetic field in the direction of canceling out the field generated by the coil 3. On the other hand, because of the presence of the first slit 51, the electroconductive film 5 has a discontinuous shape in its peripheral (tangential) direction.

Accordingly, as shown by the arrows in FIG. 6B, induced currents traveling around a specific route in mutually opposite directions are generated in the region near the outer periphery of the electroconductive film 5 and in the region near the inner periphery. An induced current Io that generates a magnetic field in the direction of canceling out the field generated by the coil 3 flows in the middle region in the radial direction of the electroconductive film 5, whereas induced currents Ia and Ib that generate magnetic fields in the direction of strengthening the field generated by the coil 3 flow at the inner peripheral edge 5a and outer peripheral edge 5b of the electroconductive film 5. The induced current Ia flows near the center of the coil 3, and is therefore effective at strengthening the field generated by the coil 3.

Figure 5A:
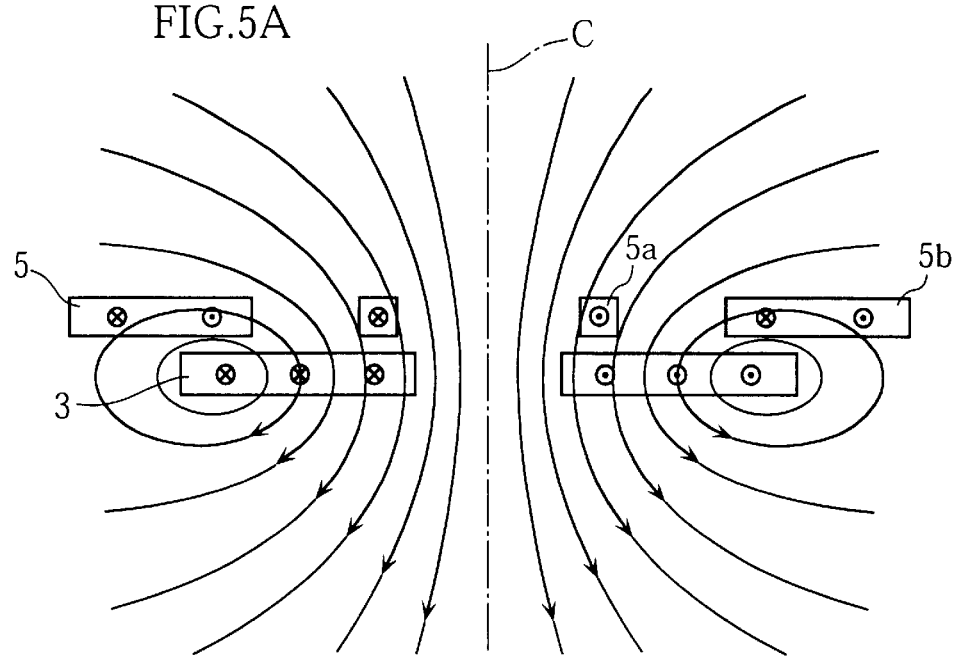
FIG. 5 is a diagram of the operation of the magnetic head shown in FIG. 1.
Figure 5B:
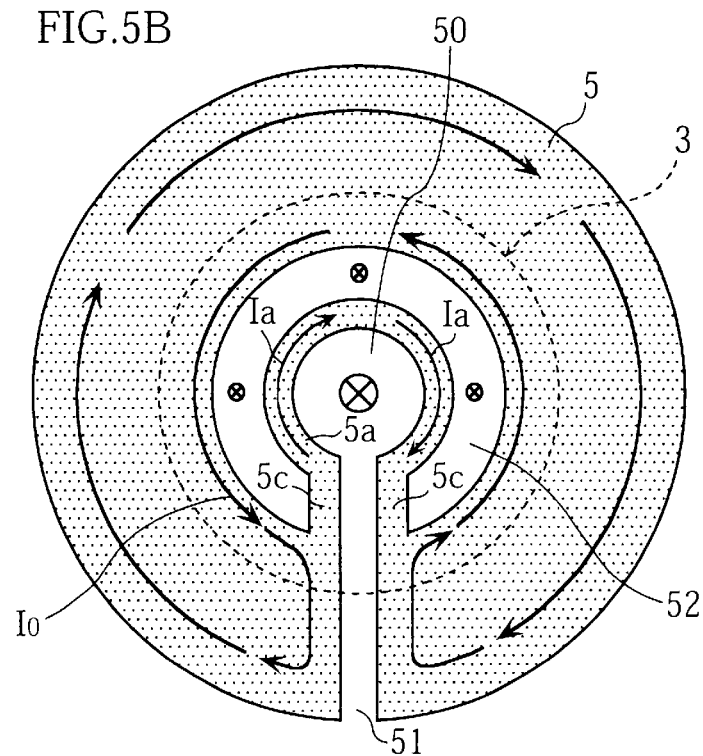

The above embodiment of the present invention involves further strengthening of the magnetic field generated by the coil 3, over and above that with the structure shown in FIG. 6B. To this end, as shown in FIG. 5B, the second slit 52 is formed in the electroconductive film 5 so as to surround the inner peripheral edge 5a thereof. Thus, induced current Io that weakens the field generated by the coil 3 does not flow to this portion where the second slit 52 is formed. Instead, the induced current Io flows through the outer periphery of the second slit 52, and this keeps this induced current Io from flowing near the inner peripheral edge 5a. Therefore, compared to the structure shown in FIG. 6, the magnetic field of the coil 3 is weakened less, to an extent corresponding to how far the induced current Io that weakens the field generated by the coil 3 can be moved away from the center of the coil 3. Naturally, in this embodiment, the induced current Ia, which acts to strengthen the magnetic field generated by the coil 3, flows because the inner peripheral edge 5a of the electroconductive film 5 is electrically connected with the region closer to the outer periphery than the second slit 52 via the pair of continuity components 5c.

Consequently, the magnetic field generated by the coil 3 can be strengthened more in this embodiment than with the structure shown in FIG. 6. As a result, it is possible to promote lower inductance in the coil 3, and this is favorable for raising the drive frequency of the coil 3 and thereby raising the rate at which data is read and written to the magneto-optical disk D. The higher the drive frequency of the coil 3, the more induced current will flow through the electroconductive film 5. Therefore, the higher the above-mentioned drive frequency is raised, the stronger the magnetic field generated by the coil 3 will be. Furthermore, it is possible to strengthen the magnetic field generated by the coil 3 in the structure shown in FIG. 6 as well, and this again leads to lower inductance of the coil 3.

The magnetic head H in this embodiment is formed with a so-called floating slider type, and the gap between the coil 3 and the recording layer 99 of the magneto-optical disk D can be extremely small, so the laser light passing through the light transmitting component 32 in the middle of the coil 3 can be focused to a tiny diameter in this portion. This allows the inside diameter of the coil 3 to be smaller, which further promotes low inductance in the coil 3. Also, with a floating slider system, the cooling efficiency at the surface of the dielectric film 4 is better due to the high-speed air flowing between the magnetic head H and the magneto-optical disk D, so temperature elevation is further suppressed in the coil 3.

Figure 7A:
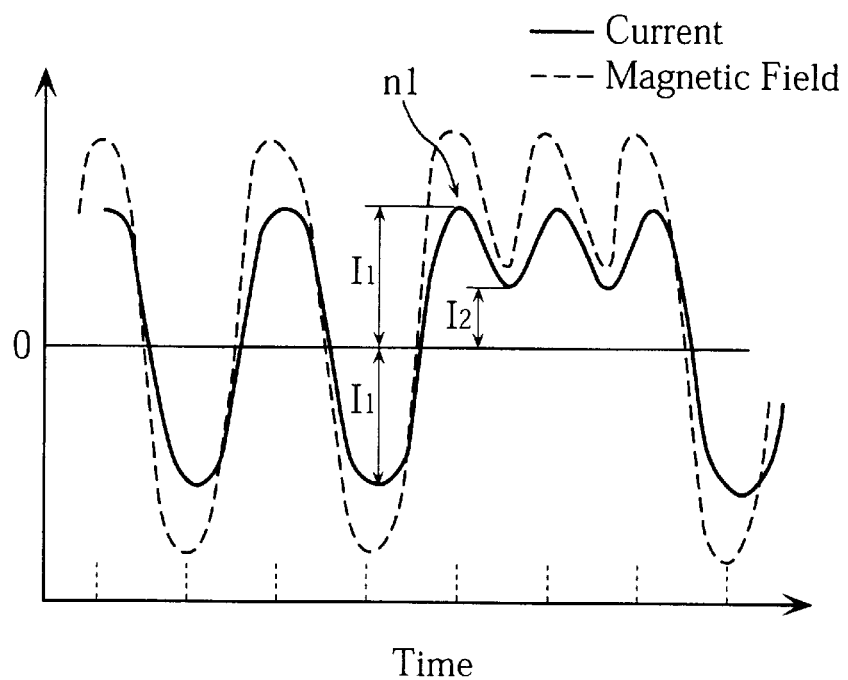
FIGS. 7A and 7B are graphs of the relationship between the generated magnetic field and the drive current of the coil.
Figure 7B:
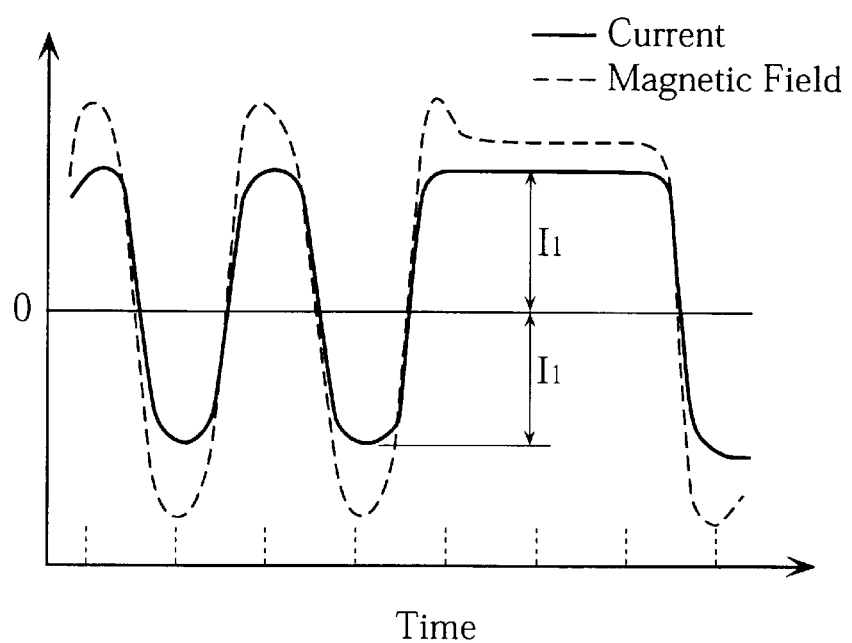

FIG. 7A is a graph of the relationship between the waveform of drive current favorable for driving the coil 3 of the magnetic head H, and the intensity of thus generated magnetic field. FIG. 7B is a contrast example. The drive current in the contrast example shown in FIG. 7B merely reverses its direction according to the contents of the data written to the magneto-optical disk D, and the basic absolute value I1 of this current is constant. In the contrast example, there is no problem when the direction of current flowing in the coil 3 is constantly reversed back and forth. However, when current continuously flows in the same direction to the coil 3, the same magnetic field is generated continuously. In this case, there is no change in the generated magnetic field, so no induced current flows in the electroconductive film 5. This means that induced current cannot be utilized to strengthen the magnetic field.

On the other hand, in the case shown in FIG. 7A, When the drive current flows continuously in the same direction to the coil 3, the value of the drive current is temporarily lowered to a current value I2 that is slightly below the current value I1, as indicated by the symbol n1, after which it is returned to the original current value I1 every time data is written to the magneto-optical disk D. Varying the drive current in this manner produces a change in the intensity of the magnetic field, so an induced current is generated at the electroconductive film 5. Thus, the intended effect of the present invention is favorably obtained.

FIGS. 8 to 13 illustrate other embodiments of the present invention. In these drawings, elements that are the same as or similar to those in the above embodiment are indicated by the same numbers.

Figure 8:
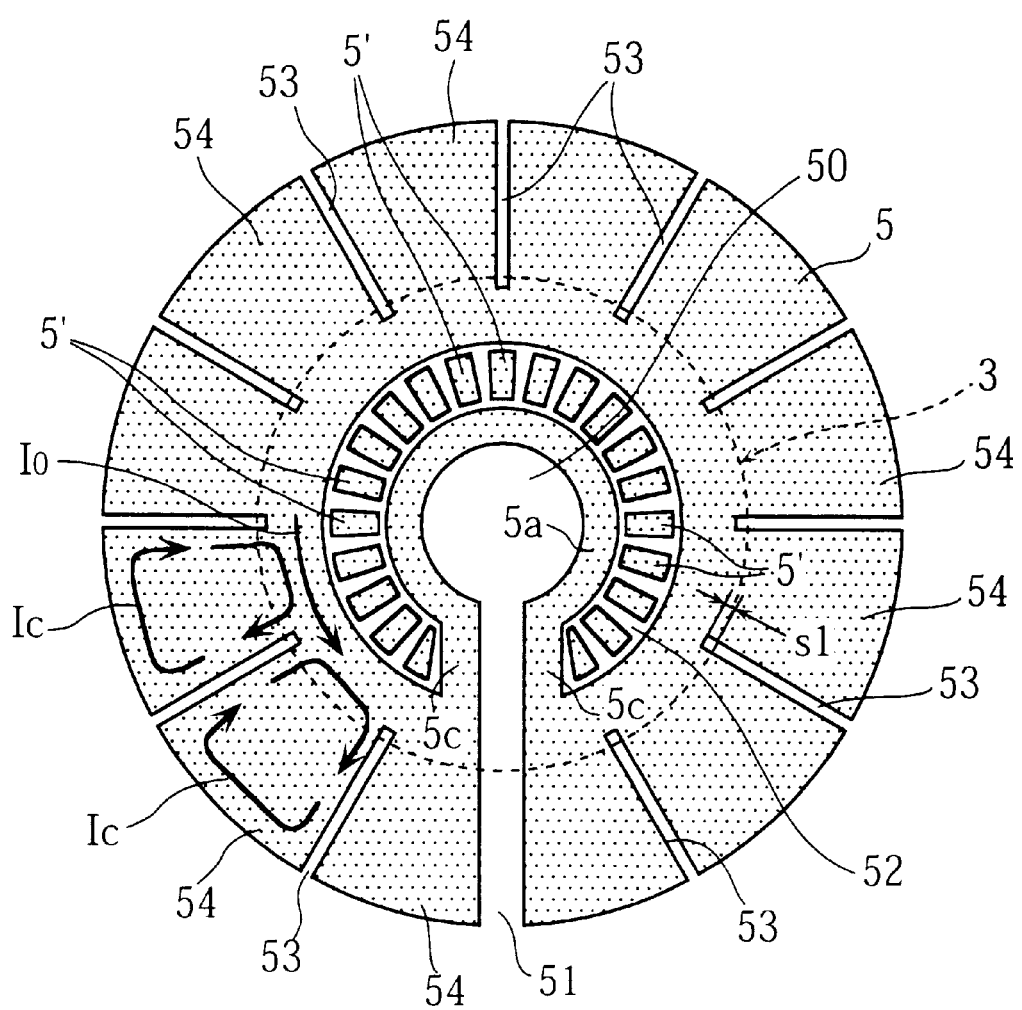
FIG. 8 is a diagram of the main components in another embodiment of the present invention.

In the configuration shown in FIG. 8, a plurality of additional electroconductive films 5' are provided within the second slit 52 of the electroconductive film 5. These electroconductive films 5' are formed at the same time as the electroconductive film 5, and gaps are formed around them so that they are electrically insulated from the peripheral edges of the second slit 52. Part of the dielectric film protrudes into these gaps. Also, a plurality of radial third slits 53 are formed in the region near the outer periphery of the electroconductive film 5. The third slits 53 each extend from a location farther out in the radial direction of the coil 3 than the second slit 52, to the outer peripheral edge of the electroconductive film 5. Preferably, one end of each of the third slits 53 is located closer (by a suitable dimension s1) to the center of the electroconductive film 5 than the outermost peripheral edge of the coil 3.

With this configuration, because the electroconductive films 5' are provided within the second slit 52, the thermal conductivity is better between the inner peripheral edge 5a of the electroconductive film 5 and the region outside of the second slit 52, as compared to when these electroconductive films 5' are not provided. Therefore, the heat radiation of the electroconductive film 5 is better, and this is preferable for suppressing temperature elevation of the coil 3.

The plurality of third slits 53 divide up the outer region of the electroconductive film 5 into a plurality of sections 54 arranged in the peripheral direction. An eddy current Ic shown in FIG. 8 flows in this plurality of sections 54 with changes in the magnetic field generated by the coil 3. However, since the surface area of the individual sections 54 themselves is small, only a little of the flux of the magnetic field generated by the coil 3 acts on each of the sections 54. Therefore, a change in the magnetic field is accompanied by less dielectric electromotive force, and the eddy current Ic is also smaller. This results in a smaller induced current Io corresponding to a branching current portion of the eddy current Ic. The induced current Io acts in the direction of weakening the magnetic field generated by the coil 3, so a reduction in this induced current Io translates into a relative strengthening of the magnetic field generated by the coil 3. As the eddy current Ic flowing in the various sections 54 decreases, the amount of Joule heat of the electroconductive film 5 itself also decreases, which is even better for suppressing temperature elevation in the coil 3 and its surroundings.

Figure 9:
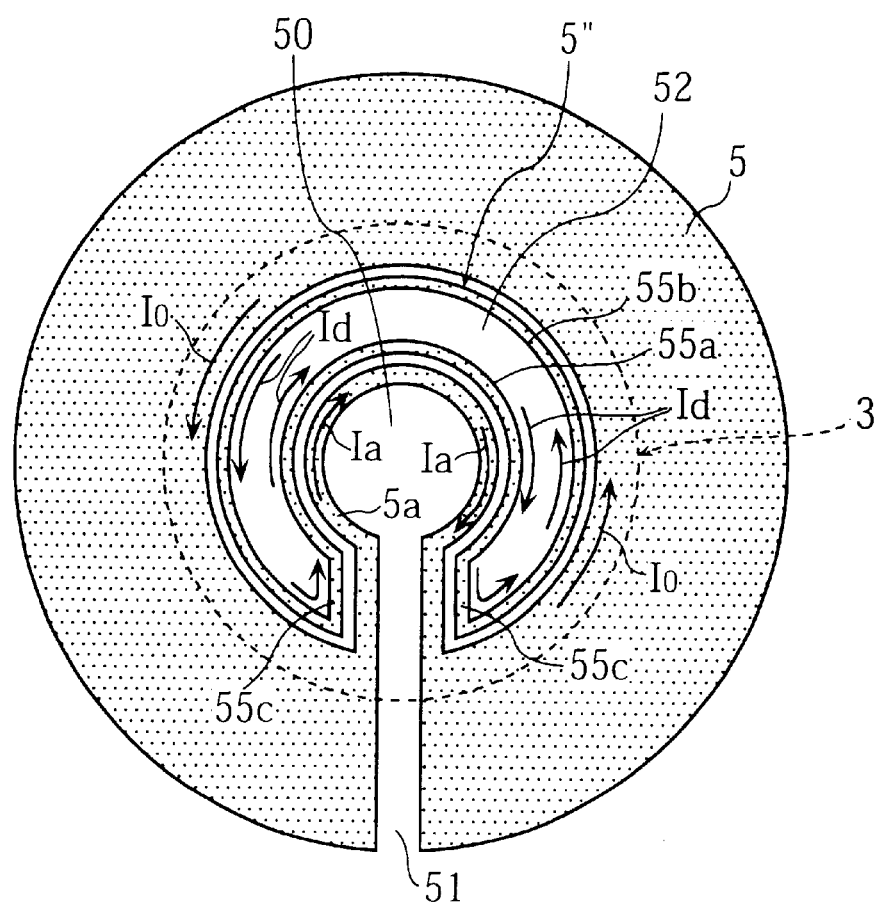
FIG. 9 is a diagram of the main components in another embodiment of the present invention.

With the configuration shown in FIG. 9, an additional electroconductive film 5" provided within the second slit 52 is formed in a hollow shape. More specifically, this electroconductive film 5" has two arc-shaped portions 55a and 55b spaced apart in the radial direction of the electroconductive film 5, and connecting portions 55c that link the ends of these two arc-shaped portions 55a and 55b together. The arc-shaped portions 55a and 55b are substantially concentric with the electroconductive film 5.

The direction of the lines of magnetic force acting on the region where the electroconductive film 5" is provided is the same as the direction of the lines of magnetic force acting on the second slit 52 and its surroundings. Therefore, an induced current Id oriented the same as the induced currents Io and Ia flowing around the second slit 52 flows in this electroconductive film 5″. Here, the induced current Id flowing in the arc-shaped portion 55a near the center flows in the same direction as the induced current Ia, and generates a magnetic field that acts in the direction of strengthening the magnetic field generated by the coil 3. As a result, this is even better for strengthening the above-mentioned generated field. Just as with the electroconductive films 5′ shown in FIG. 8, the electroconductive film 5″ improves the thermal conductivity of the portion of the electroconductive film 5 where the second slit 52 is formed, and thereby helps to improve the heat radiation of the electroconductive film 5.

Figure 10:
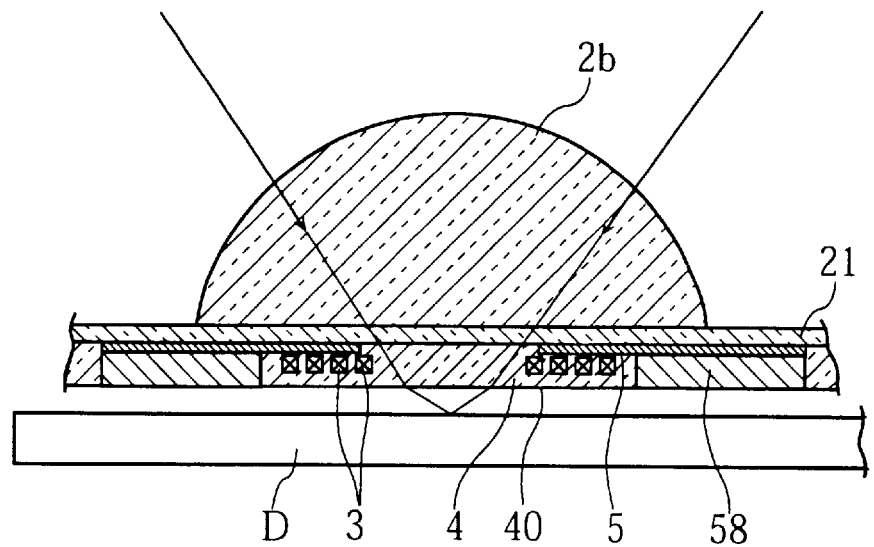
FIG. 10 is a cross section of the main components in another embodiment of the present invention.

With the configuration shown in FIG. 10, a thick portion 58 protruding toward the surface 40 of the dielectric film 4 is provided on a part of the electroconductive film 5. This thick portion 58 may be structured such that it is exposed to the outside from the surface of the dielectric film 4, or may be structured such that it is buried near the surface layer of the dielectric film 4. Because the electroconductive film 5 has higher thermal conductivity than the dielectric film 4, this configuration allows the heat radiation of the electroconductive film 5 to be raised by an amount corresponding to how close part of the electroconductive film 5 is to the surface layer of the dielectric film 4.

Figure 11:
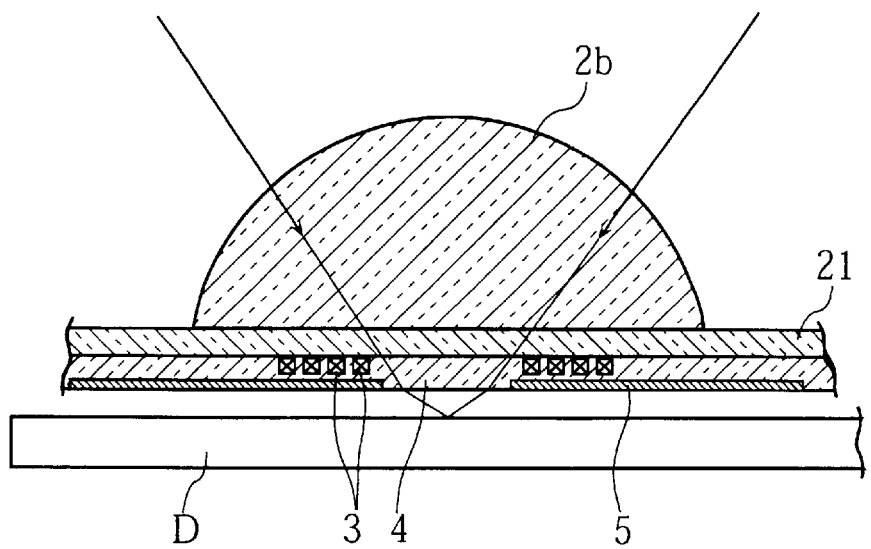
FIG. 11 is a cross section of the main components in another embodiment of the present invention.

With the configuration shown in FIG. 11, the electroconductive film 5 is provided such that it is located closer to the magneto-optical disk D than the coil 3. This configuration allows the electroconductive film 5 to be disposed near the surface of the dielectric film 4, which is again advantageous in that the heat radiation thereof can be improved.

Figure 12:
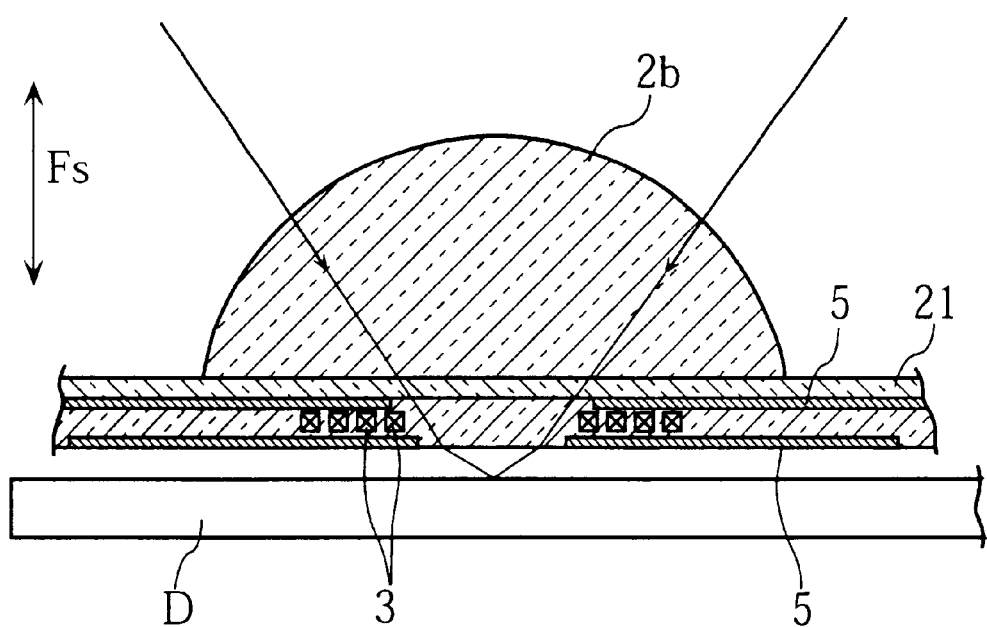
FIG. 12 is a cross section of the main components in another embodiment of the present invention.

With the configuration shown in FIG. 12, a pair of electroconductive films 5 are provided sandwiching the coil 3 in the focus direction Fs. This configuration increases the number of electroconductive films 5 exhibiting a heat radiation action, which is favorable in that temperature elevation of the coil 3 can be suppressed in proportion to the increase in the volume of the electroconductive films. The efficiency at which the magnetic field is generated can also be raised by increasing the total amount of induced current corresponding to the induced current Ia shown in FIG. 5B.

Figure 13A:
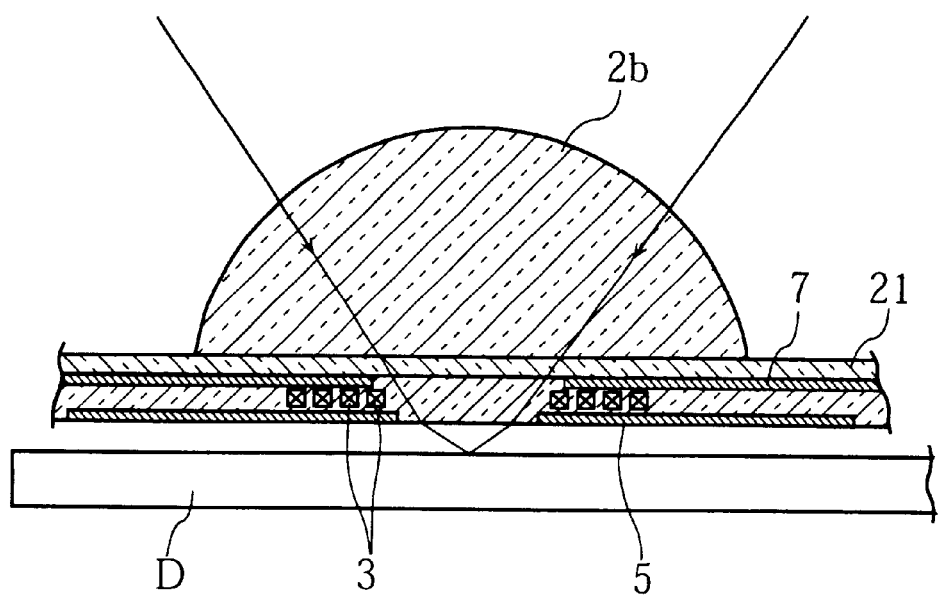
FIG. 13A is a cross section of the main components in another embodiment of the present invention.

With the configuration shown in FIG. 13a, the electroconductive film 5 is formed at a location closer to the magneto-optical disk D than the coil 3, for example, and a magnetic film 7 is formed at a location opposite the magneto-optical disk D, sandwiching the coil 3. The role of this magnetic film 7 is to focus the magnetic field generated by the coil 3 at the place where the beam spot is formed. When the magnetic film 7 is provided, problems that were discussed in the prior art section are encountered, whereby an eddy current flows and cancels out the changes in the magnetic field generated by the coil 3, or the magnetic film 7 generates heat, but providing the electroconductive film 5 eliminates problems related to the strength of the magnetic field generated by the coil 3 and the temperature elevation of the coil 3. Therefore, the electroconductive film 5 does not necessarily have to be provided instead of a conventional magnetic film in the present invention, and the configuration may include both a magnetic film and the electroconductive film 5.

Figure 13B:
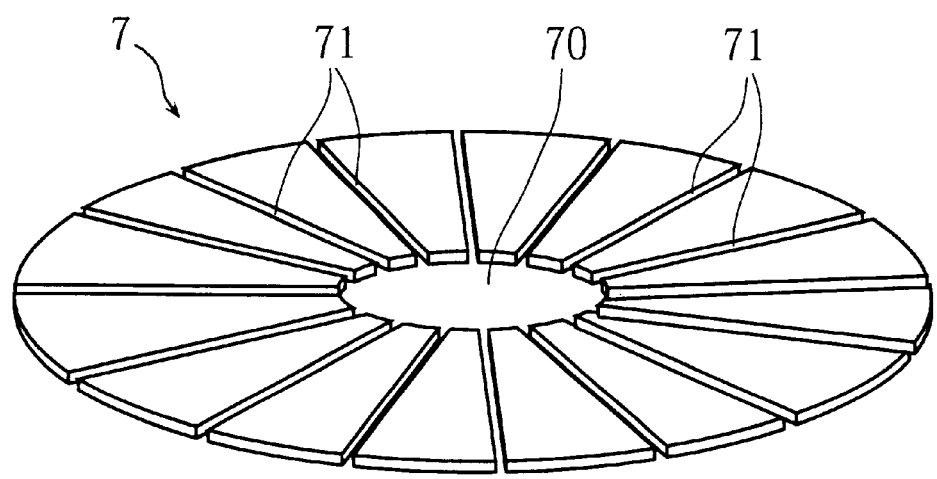
FIG. 13B is an oblique view of an example of a magnetic film.
Figure 14:
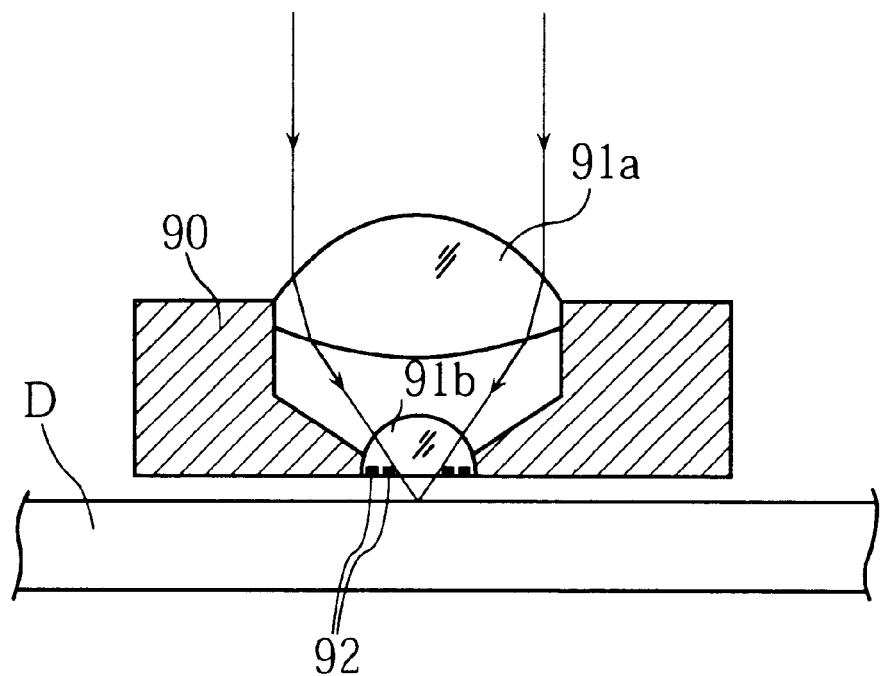
FIG. 14 is a diagram of an example of prior art.

As shown in FIG. 13B, for example, it is favorable for the magnetic film 7 to have a light transmitting component 70 in its center for transmitting laser light, and to be divided up into a plurality of regions by a plurality of radial slits 71. With this configuration, unlike with a conventional magnetic film in the form of a simple hollow disk, the eddy current flowing in the magnetic film 7 when the magnetic field changes can be reduced, and the amount of heat generated by the magnetic film 7 can be reduced.

The present invention is not limited to the above embodiments, and the specific configurations of the various components of the magnetic head can be variously modified.

For instance, a plurality of first slits 51 can be provided, rather than just one. The same operation as above is obtained when a plurality of first slits 51 are provided. Similarly, the second slit 52 may be provided in a form in which it is divided into a plurality of sections in the present invention.

The coil 3, dielectric film 4, and electroconductive film 5 can also be formed directly on the lens surface of the object lens. The magnetic head pertaining to the present invention does not necessarily have to be configured as a floating slider type, and may instead be configured as a magnetic head capable of moving in the focus direction or tracking direction by the drive of an actuator, for instance. The magnetic head pertaining to the present invention can also be configured as a magnetic head having no object lens. Nor are there any particular restrictions on the specific type of recording medium used.

As can be seen from the above description, with the present invention, it is possible to suppress temperature elevation in the coil of a magnetic head and keep the inductance of the coil low. Therefore, it is possible to raise the drive frequency of the coil while preventing heat damage to the coil or other such problems, which contributes to a higher data transfer rate.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A magnetic head comprising:
    a coil for applying a magnetic field to a recording medium; and
    a first electroconductive film superposed over the coil in an axial direction of the coil so as to be electrically insulated from the coil, the electroconductive film being formed with a central hole,
    wherein the first electroconductive film is composed of a non-magnetic substance, and
    wherein the first electroconductive film is formed with a first slit extending from the hole to an outer peripheral edge of the electroconductive film.

2. The magnetic head according to claim 1, wherein the first electroconductive film is provided with a second slit surrounding an inner peripheral edge of the first electroconductive film and with a continuity component that electrically connects part of the inner peripheral edge of the first electroconductive film to a region of the film that is outside of the second slit.

3. The magnetic head according to claim 1, further comprising a dielectric film that covers the coil and includes a surface facing the recording medium, the dielectric film electrically insulating the coil from the first electroconductive film.

4. The magnetic head according to claim 3, wherein the first electroconductive film has a higher thermal conductivity than the dielectric film.

5. The magnetic head according to claim 1, wherein the first electroconductive film has an outer diameter which is greater than an outside diameter of the coil.

6. The magnetic head according to claim 1, further comprising an object lens for forming a beam spot on the recording medium by focusing a light beam traveling from a light source, wherein after passing through the object lens, the light beam reaches the recording medium via a light transmitting component formed in the center of the coil and the hole formed in the first electroconductive film.

7. The magnetic head according to claim 1, wherein the second slit is formed substantially in a C-shape having two ends, the continuity component being disposed between the first slit and the ends of the second slit.

8. The magnetic head according to claim 2, further comprising an additional electroconductive film arranged in the second slit, the additional electroconductive film being electrically insulated from the first electroconductive film.

9. The magnetic head according to claim 8, wherein the additional electroconductive film includes two arc-shaped portions spaced apart in a radial direction of the coil, and connecting portions that link together ends of the two arc-shaped portions.

10. The magnetic head according to claim 2, wherein the first electroconductive film is formed with a plurality of third slits extending radially of the coil, each of the third slits running from a location outside of the second slit to an outer peripheral edge of the first electroconductive film.

11. The magnetic head according to claim 3, wherein the first electroconductive film is located opposite the recording medium with the coil therebetween and is covered by the dielectric film.

12. The magnetic head according to claim 11, wherein the first electroconductive film is provided with a thick portion protruding toward a surface of the dielectric film.

13. The magnetic head according to claim 3, wherein the first electroconductive film is located closer to the recording medium than the coil.

14. The magnetic head according to claim 3, wherein the first electroconductive film includes two electroconductive film members that sandwich the coil in an axial direction of the coil.

15. The magnetic head according to claim 1, further comprising a slider that floats over the recording medium when the recording medium rotates, the coil and the first electroconductive film being mounted on the slider.

16. A data recording and reproduction device comprising the magnetic head according to claim 1.

* * * * *